United States Patent [19]

Huether et al.

[11] Patent Number: 4,878,821
[45] Date of Patent: Nov. 7, 1989

[54] DETACHABLE ANTI-RUPTURE RING FOR THE HOUSING OF A TURBO POWER PLANT

[75] Inventors: Werner Huether; Axel Rossman, both of Karlsfeld; Siegfried Sikorski, Munich, all of Fed. Rep. of Germany

[73] Assignee: MTU Motoren-und Turbinen-Union Munchen GmbH, Dachauer, Fed. Rep. of Germany

[21] Appl. No.: 154,142

[22] Filed: Feb. 9, 1988

[30] Foreign Application Priority Data

Feb. 11, 1987 [DE] Fed. Rep. of Germany ....... 3704197

[51] Int. Cl.[4] .............................................. F01D 25/24
[52] U.S. Cl. .................................... 415/9; 415/121.2; 415/197; 415/219.1; 416/190; 416/218; 416/230; 403/344; 138/158; 24/603
[58] Field of Search .............. 60/39.091, 223; 415/9, 415/121.2, 128, 197, 219.1; 416/230, 218, 190; 403/344; 24/603, 265 R; 138/158, 161

[56] References Cited

U.S. PATENT DOCUMENTS

| 1,966,863 | 7/1934 | Kipp ..................... 138/161 |
| 3,093,031 | 6/1963 | Damm ..................... 24/603 |
| 3,309,749 | 3/1967 | Gill ..................... 403/344 |
| 4,086,685 | 5/1978 | Gaylord ..................... 24/603 |
| 4,452,563 | 6/1984 | Belanger et al. ............... 415/121 G |
| 4,484,856 | 11/1984 | Patacca ..................... 415/9 |
| 4,699,567 | 10/1987 | Stewart ..................... 415/200 |
| 4,705,454 | 11/1987 | Bouiller et al. ..................... 415/197 |

FOREIGN PATENT DOCUMENTS 656019  1/1938  Fed. Rep. of Germany ...... 138/161

Primary Examiner—Donald E. Stout
Attorney, Agent, or Firm—Roberts, Spiecens & Cohen

[57] ABSTRACT

An anti-rupture ring is slit axially at least at one location and is provided thereat with clamping devices which permit a rapid tightening and loosening of the anti-rupture ring. In one embodiment, the clamping of the anti-rupture ring can be varied hydraulically so as to minimize clearance losses in operation. The invention can be used in all types of turbo engines endangered by breakage of rotor blades, particularly in aircraft gas turbine construction, and it permits simple, damage-free mounting and a well-defined clamping of the anti-rupture ring.

12 Claims, 2 Drawing Sheets

DETACHABLE ANTI-RUPTURE RING FOR THE HOUSING OF A TURBO POWER PLANT

FIELD OF THE INVENTION

The present invention relates to an anti-rupture ring for the housing of turbo power plants in regions subject to breakage of blades of a rotor.

BACKGROUND

In the operation of turbo power plants, there is the danger that the blades of turbine or compressor rotors will break. Upon breakage of a blade the broken pieces have considerable energy due to the generally high speed of rotation of the rotor, as a result of which the pieces are thrown substantially tangentially outward. In such case there is the danger that the broken pieces will pass through the housing of the power plant and do considerable damage. Particularly in the case of aircraft power plants, vitally necessary fuel or hydraulic conduits can be damaged, as a result of which the aircraft can crash or broken fragments can enter into the passenger compartment and injure passengers in the plane.

In order to avoid these consequences, the turbine housings are generally sufficiently reinforced at the likely locations where there can be blade breakage. As a result of the increasing energy of the blades in modern power plants due to the constantly increasing demands for higher speeds of rotation, the wall thicknesses of the housing and thus the weight of the power plant have had to be progressively increased in order to assure sufficient protection. In particular, for modern fan power plants, anti-rupture rings are known which consist, at least in part, of light weight materials of high strength and high energy absorption, such as, for instance, aramide fibers. In this way, high protective action can be advantageously combined with low weight of the anti-rupture ring.

Upon overhaul or repairs on power plant housings, it is frequently necessary to carry out tasks, such as testing for cracks or galvanic processes for which it is necessary temporarily to remove the anti-rupture ring. Removal of the anti-rupture ring by axial displacement is frequently questionable since the housing rings have threaded flanges on both sides which substantially increase the difficulty of displacement of the anti-rupture ring.

The technique of manufacturing anti-rupture rings with fiber reinforcement, however, requires heat curing of the resin matrix. With a tightly wound anti-rupture ring, variable stresses are produced in the ring and housing as a result of different thermal expansions and shrinkages, which may be undesired or, upon cooling, lead to spaces between the ring and the housing.

SUMMARY OF THE INVENTION

An object of the present invention is to provide an anti-rupture ring for turbo plants which can be applied and removed in simple fashion without damage and wherein the clamping is adjustable in a well-defined fashion.

This object is achieved, in accordance with the invention, by providing a slit in the ring at least at one location in the circumference of the ring, the slit extending in the direction of the axis of the power plant and detachable clamping device are mounted at this location for adjusting the circumferential tension in the ring.

The anti-rupture ring of the invention has the advantage that after loosening the clamping devices, the anti-rupture ring can be spread open and in simple manner pulled away from the housing of the power plant even over obstacles such as flanges. The anti-rupture ring is advantageously produced, at least in part, by means of fiber technology so that it is of a low weight for a high protective effect.

In different embodiments, one or more clamping devices can be provided at the slit in the anti-rupture ring for clamping the ends of the ring segments to each other. In this respect, a clamping of the segments to each other is necessary in order to achieve a uniform clamping effect, which would not be assured in the event of fastening to one end of the ring housing. With only one clamping device, a simple mounting is possible, whereas a plurality of clamping devices assure small structural size and well-distributed clamping forces.

The clamping device is constructed according to one embodiment as a threaded fastener or bolt. In this case, a tension spring is advantageously provided, as a result of which a well-defined clamping of the anti-rupture ring can be obtained.

In another embodiment, the clamping device is constructed as a hydraulic element. This has the advantage that the clamping force of the anti-rupture ring can be changed during operation. Since the adjacent wall of the power plant housing is comparatively thin, it is so elastically deformed upon the clamping of the anti-rupture ring on the housing wall that the space between the housing wall and the tips of the radially inner rotor blades can decrease. After starting the operation of the turbo power plant, the thermal expansion of the rotor is less than that of the housing since the former has a large mass and does not come directly into contact with the stream of hot gas. As a result, the clearance between the blade tips and the housing increases, due to which the efficiency decreases as a result of leakage flows. A so-called "push hole" is produced. By hydraulic control of the expansion of the anti-rupture ring, the required expansion of the housing can be optimized in accordance with the requirements of minimum clearance and thus the efficiency can be improved.

The anti-rupture ring is preferably formed with axial slits at two opposite locations and thereat provided with clamping devices in order to obtain more balanced loads in the housing and the anti-rupture ring. In this case, the anti-rupture ring should be so placed that no endangered parts of the power plant or the craft lie outside the closure regions which possibly have less protective effect.

Means are advantageously provided for reducing friction between the housing and the anti-friction ring, whereby a more uniform distribution of the force is obtained. Such means may be in the form of anti-friction coatings, anti-friction intermediate layers, rolling members or combinations thereof.

BRIEF DESCRIPTION OF THE FIGURES OF THE DRAWING

Embodiments of the invention are shown diagrammatically in the accompanying drawing, in which.

DETAILED DESCRIPTION OF PREFERRED EMBODIMENTS OF THE INVENTION

Figure 1:
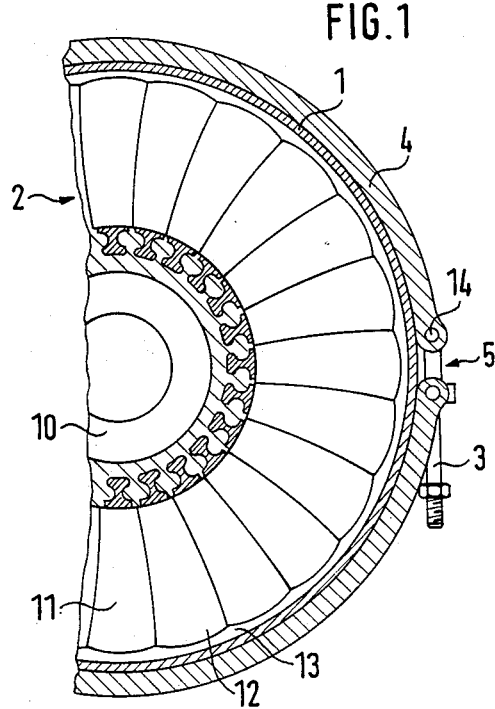
FIG. 1 is a transverse cross section through a turbo power plant showing a portion of a rotor with an anti-rupture ring according to the invention.

FIG. 1 shows a housing 1 of a turbo power plant 2 and a rotor 10 of the power plant rotates within the housing 1. The rotor 10 includes radial blades 11 whose tips 12 are spaced from the housing 1 by a clearance 13. The housing is surrounded by an anti-rupture ring 4. The anti-rupture ring 4 is slit axially at a location 5 and is detachably held together thereat by clamping devices 3. The clamping devices 3 are connected by bolts 14 to the adjacent, facing ends of the anti-rupture ring 4.

Figure 2:
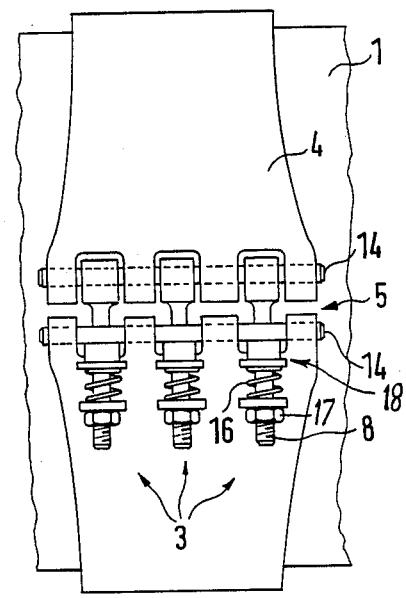
FIG. 2 is a side view of a portion of the power plant in FIG. 1.

In FIG. 2 it is seen that the anti-rupture ring 4 which surrounds the housing 1 is held together by three threaded fasteners or bolts 8 provided with tension springs 16. The bolts 8 are spaced axially along the slit in the ring. More specifically, each clamping device 3 comprises a threaded bolt 8 connected to bolt 14 which is rotatable in one end of the slit ring 4 and a nut 17 is threaded on the bolt 8 and bears via spring 16 against a counter member 18 pivotably bearing against the bolt 14 in the other confronting end of the slit ring 4. By turning nut 17 in one direction, the clamping force applied to the ends of the ring 4 is increased against the action of spring 16 while turning the nut in the opposite direction will reduce the clamping force.

Figure 3:
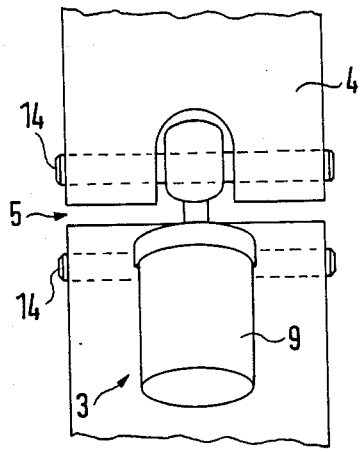
FIG. 3 shows a portion of an anti-rupture ring with a hydraulic clamping device according to another embodiment of the invention.
Figure 4:
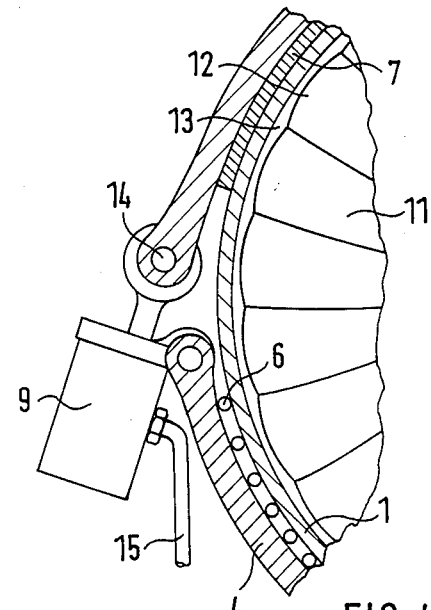
FIG. 4 is a cross section, an enlarged scale, through a portion of the power plant housing and anti-rupture ring with the hydraulic clamping device.
Figure 5:
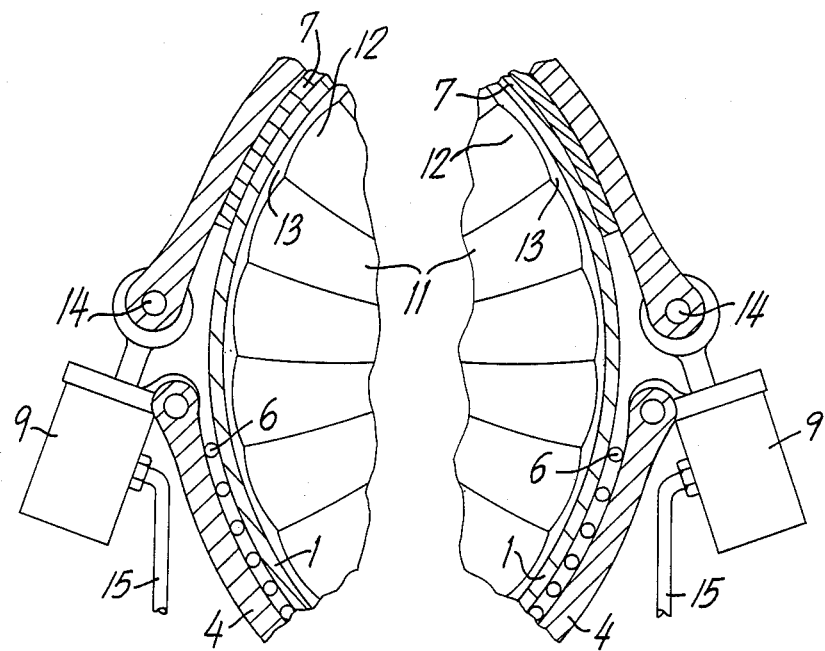

FIG. 3 shows another embodiment of the clamping device 3 which is formed as a hydraulic piston 9. The hydraulic piston has a housing pivotably secured to bolt 14 at one end of the ring 4 whereas the rod of the piston is pivotably secured to the bolt 14 at the other end of the ring 4. The hydraulic piston 9 is connected by a hydraulic conduit 15 as shown in FIG. 4 to a hydraulic control device, not shown. Thereby, the clamping force applied to the ends of the ring 4 can be regulated as desired, even during operation.

In the embodiment shown in FIG. 4, different means for reducing friction between housing 1 and anti-rupture ring 4 are shown. Such means can be constructed as anti-friction intermediate layer 7 or rolling members such as balls or needle roller 6. The layer 7 can be a coating of anti-friction material or a separate layer, such as Teflon foil.

Although the invention has been described in relation to specific embodiments thereof, it will become apparent to those skilled in the art that numerous modifications and variations can be made within the scope and spirit of the invention as defined in the attached claims.

What is claimed is:

1. An anti-rupture ring for a housing of a turbo power plant in a region subject to breakage of blades of a rotor in the housing, said ring having an axial slit and opposite spaced ends at said slit and comprising at least one detachable clamping device engaging the ends of the ring at said slit and including means for applying adjustable force to the ends of the ring and thus adjustable circumferential tension in said ring, said at least one clamping device comprising a hydraulic piston.

2. An anti-rupture ring according to claim 1 wherein said ring is made in part of fiber-reinforced materials.

3. An anti-rupture ring according to claim 1 wherein said ring is provided with one axial slit at two diametrically opposite locations, said at least one said clamping device being provided at both locations.

4. An anti-rupture ring according to claim 1 comprising means for reducing friction between the housing and the anti-rupture ring.

5. An anti-rupture ring according to claim 4, wherein the means for reducing friction comprises a coating of anti-friction material on at least one of said anti-rupture ring and the housing.

6. An anti-rupture ring according to claim 4, wherein said means for reducing friction comprises an intermediate anti-friction layer between said anti-rupture ring and the housing.

7. An anti-rupture ring according to claim 6 wherein said anti-friction layer comprises a Teflon foil.

8. An anti-rupture ring according to claim 4, wherein the means for reducing friction comprises rolling anti-friction members between the anti-rupture ring and the housing.

9. An anti-rupture ring according to claim 8 wherein said rolling anti-friction members are needle rollers.

10. An anti-rupture ring according to claim 1 wherein said ring is provided with one axial slit at two diametrically opposite locations and said one clamping device is provided at one of said locations.

11. An anti-rupture ring according to claim 1 wherein said at least one clamping device comprises a cylinder pivotably connected to one of said ends of the ring at said slit and a piston pivotably connected to the other of said ends of the ring at said slit.

12. An anti-rupture ring according to claim 11 comprising a hydraulic control device connected to said cylinder.

* * * * *